United States Patent
McCormack et al.

(10) Patent No.: US 7,076,053 B1
(45) Date of Patent: Jul. 11, 2006

(54) SYSTEM FOR THE PROCESSING OF AUDIO DATA USED FOR MUSIC ON HOLD AND PAGING IN A PRIVATE BRANCH EXCHANGE

(75) Inventors: Michael S. McCormack, Gloucester, MA (US); Paul Dryer, Andover, MA (US)

(73) Assignee: 3Com Corporation, Marlborough, MA (US)

( * ) Notice: Subject to any disclaimer, the term of this patent is extended or adjusted under 35 U.S.C. 154(b) by 821 days.

(21) Appl. No.: 09/760,525

(22) Filed: Jan. 12, 2001

(51) Int. Cl.
*H04M 9/00* (2006.01)
*H04M 1/00* (2006.01)

(52) U.S. Cl. ............... 379/387.02; 379/196; 379/198; 379/268; 379/269; 370/355

(58) Field of Classification Search ............ 379/93.8, 379/93.9, 93.14, 93.15, 165, 166, 162, 196–198, 379/387.02, 399.02, 217.01, 199, 156, 268–269; 370/355
See application file for complete search history.

(56) References Cited

U.S. PATENT DOCUMENTS

| | | | | |
|---|---|---|---|---|
| 5,400,397 A * | 3/1995 | Ryu | ........................... | 379/157 |
| 5,488,570 A * | 1/1996 | Agarwal | ..................... | 345/501 |
| 5,546,395 A * | 8/1996 | Sharma et al. | .............. | 370/468 |
| 5,689,534 A * | 11/1997 | Anderson et al. | ........... | 375/364 |
| 5,835,495 A * | 11/1998 | Ferriere | ...................... | 370/465 |
| 5,912,958 A * | 6/1999 | Eyran et al. | ................ | 379/170 |
| 6,072,826 A * | 6/2000 | Turnbull et al. | ............ | 375/222 |
| 6,141,341 A * | 10/2000 | Jones et al. | .................. | 370/352 |
| 6,226,616 B1 * | 5/2001 | You et al. | ................... | 704/500 |
| 6,384,759 B1 * | 5/2002 | Snyder | ....................... | 341/123 |
| 6,407,325 B1 * | 6/2002 | Yi et al. | ....................... | 84/610 |
| 6,560,329 B1 * | 5/2003 | Vicars et al. | .......... | 379/265.02 |
| 6,714,534 B1 * | 3/2004 | Gerszberg et al. | .......... | 370/352 |

* cited by examiner

*Primary Examiner*—Doris H. To
*Assistant Examiner*—Tuan Pham
(74) *Attorney, Agent, or Firm*—McGlew & Tuttle, PC

(57) ABSTRACT

The PBX system includes an analog to digital, and digital to analog, (A/D) conversion where the sample size and the sample rate are selectively adjustable. The A/D structure includes registers which hold values indicating the sample size and the sample rate for the conversion. When the A/D structure is configured, the A/D structure reads the values in the register and configures itself to the sample rate and sample size indicated by the registers. When the sample size and sample rate is to be changed, the values in the registers are changed and the A/D structure is reconfigured.

17 Claims, 7 Drawing Sheets

SYSTEM FOR THE PROCESSING OF AUDIO DATA USED FOR MUSIC ON HOLD AND PAGING IN A PRIVATE BRANCH EXCHANGE

FIELD OF THE INVENTION

The present invention relates to telephone systems commonly known as Private Branch eXchanges (PBX), and more specifically to the analog/digital back and forth conversion performed for music/audio on hold and paging in a digital PBX.

BACKGROUND OF THE INVENTION

Practically all communities, whether they are local, regional or national, have a public utility telephone company that connects the individual members of that community. Many subgroups of this community desire to have their own telephone network to communicate amongst themselves. These subgroups also desire to connect their private telephone network to the public utility telephone company so that their members can use their private telephone network to connect to other members of the community. The private telephone network is often referred to as a Private Branch eXchange and the public utility telephone company is referred to as the Public Switched Telephone Network (PSTN).

Many PBXs digitize the telephone conversations and also use digital signals to control the operation of the PBX. This requires the use of a coder/decoder (codec) to code and decode the telephone conversations from analog to digital and vice versa. The codec is also known as a combination of, or just one of, an analog/digital or digital/analog converter. Each individual telephone in a digital PBX includes a codec. The PSTN interface unit connecting the digital PBX to the PSTN also includes a codec for converting the digital telephone conversations of the PBX into analog telephone conversations according to the format of the local PSTN.

Many PSTN's are analog and strictly limit the amount of a telephone conversation that is transferred across the PSTN. This limiting of telephone conversations reduces the quality of the telephone conversation. Codec's in prior art digital PBXs were selected to have the same quality as the local PSTN since any increase in quality of a codec would be eliminated by the local PSTN. Besides the quality level of the local PSTN was often sufficient.

During many telephone conversations, it is often necessary for one of the parties to temporarily stop the conversation and block personal audio from being transmitted. The other party is then put on "hold" and can be made to listen to silence. Some PBXs have structure to receive an external audio signal, such as music or an audio presentation, and transmit this to the other party when the other party has been put on hold. In a digital PBX, a codec is used to convert the analog external audio into digital audio for transmission through the PBX. The quality of the codec used for the external audio would be the same as that used in the PSTN interface unit. In this way, many of the same parts for existing codec's could be used in the external audio codec and the quality would be similar to the quality of the PSTN which was sufficient for the average user.

Many PBXs have been installed in organizations that have a public address (PA) system. It is often desirable to connect the PA system to the PBX so that the PA system can be used from any phone. With a digital PBX a codec is required to convert the digital audio from a phone into analog audio for the PA system. The same quality of codec's that are used to convert digital conversations into analog audio is used for the PA system since the parts are readily available and are designed for use with the digital audio that has been coded at the telephone.

The disadvantage of prior art PBXs is that the quality of music on hold, the quality of audio in a PA system, and the form or format of the digital audio is dictated by the characteristics and requirements of the PSTN.

SUMMARY AND OBJECTS OF THE INVENTION

It is a primary object of the present invention to be able to selectively vary the quality of music/audio on hold and the quality of audio in a PA system according to the desires of the operator of the PBX. Each operator is then able to reach a compromise between audio quality and network traffic. Increasing the quality of music on hold and PA audio will increase network traffic. Decreasing quality will decrease network traffic. Depending on the capacity, use, and requirements of each individual PBX, the audio of the music on hold, and the PA audio can be selectively adjusted.

The present invention accomplishes this by providing an analog to digital, and digital to analog, (A/D) conversion where the sample size and the sample rate are selectively adjustable. Such A/D conversion structure is well-known in the field of personal computer sound cards such as those marketed under the Sound Blaster trademark or commonly found in practically all new computers presently sold.

This A/D structure includes registers which hold values indicating the sample size and the sample rate for the conversion. When the A/D structure is configured, the A/D structure reads the values in the register and configures itself to the sample rate and sample size indicated by the registers. When the sample size and sample rate is to be changed, the values in the registers are changed and the A/D structure is reconfigured. The changing of the values in the registers, and the reconfiguring, is preferably performed by a software program. It is also possible to change the values of the registers, and reconfigure, by a hardware change, or a combination of hardware and software programming. Such A/D structure, the changing of the register values, and the reconfiguring, are known to a person of ordinary skill in the field of programming personal computers and is well documented. Therefore no further description is necessary or warranted.

The PBX system of the present invention includes a plurality of phones which are connected to a PBX hub. The phones of the present invention include a codec for receiving a digital telephone conversation and converting the received digital conversation into analog audio for listening by the user of the phone. The codec in the phone also converts analog audio from the phone user into a digital conversation for transmission to the PBX hub. All of the PBX phones are connected to a PBX network unit in the PBX hub. The PBX hub also includes a PSTN unit for connecting to the PSTN. A control unit inside the PBX hub controls the telephone conversations between the individual PBX phones and between the PBX phones and users of the PSTN.

The PBX hub also includes an external audio input for receiving analog audio from an audio source. A codec inside the PBX hub receives the external analog audio and digitizes this external audio according to the values in the register. The digitized audio is then made available to the PBX phones and to any telephone conversation coming in through the PSTN. In a preferred embodiment, packets of the digitized external audio is constantly sent to the PBX network unit and to the individual PBX phones. Whenever a PBX phone has been placed on hold, the PBX phone accepts the external audio packets and plays the packets for the user of the PBX phone.

The external audio is usually music or a description of the organization operating the PBX in order to keep the person on hold entertained while being on hold. Increasing the quality of the external audio played to the user should increase the listening pleasure of the user. The present invention increases the quality of the audio by increasing the sample size and sample rate.

When an analog signal is digitized, the value of the analog signal is measured at a specific point in time, and this measured value is digitized. The corresponding digital signal is considered to remain at this measured value until the next measuring of the analog signal. Each measuring of the analog signal is considered to be a sample. If the measuring or sampling occurs far apart in time, changes in the analog signal between the sampling points will not be represented in the digital signal. If the sampling occurs close together, which would be at a high sample rate, the digital signal will more accurately represent the analog signal. High sample rates increase in the amount of data transfer across the PBX network which increases in the network traffic. This can cause a slowing down of the data across the network, and possibly reduce the quality of other telephone conversations.

The measuring precision of the analog signal also needs to be considered. If the analog signal is measured very precisely, then each measurement or sample will be a number having many digits. The quality of the digital signal is better and the amount of data transferred across the network is also larger. If the analog signal is measured imprecisely, or roughly, less digits are needed for the measurements. Imprecisely or roughly measuring the analog signal decreases the traffic, and also decreases the quality.

If many telephone conversations are occurring, if the connection between the phones and the PBX hub are of poor quality, and/or if the quality of audio on hold is not an important consideration, the sample size and/or sample rate can be low in order to save the capacity of the PBX for telephone conversations. If few simultaneous telephone conversations are expected, if the connection between the phones and PBX hub are of high-quality, and/or if the quality of audio is an important consideration, the sample size and sample rate can be high to increase the listening pleasure of the user on hold.

In the present invention, the PBX is preferably incorporated into a computer network as described in U.S. patent application Ser. No. 09/203,542, and incorporated by reference. Computer data and telephone data therefore share the same lines and depending on the computer data traffic, lines could become congested. By the present invention having the sample rate and sample size being adjustable, a compromise can be made in every PBX system of the present invention, between data transfer rates and the quality of audio on hold. It is also possible to automatically adjust the sample size and sample rate in real-time into order to adjust to the constantly changing conditions of a computer network. Quality of audio on hold can therefore be maximized whenever possible without interfering with other data across the network.

The A/D structure of sound cards in personal computers also provides the ability to convert digital signals of different sample sizes and sample rates into audio. This same A/D structure used in the present invention for receiving external audio, can also be used to provide external audio for a paging or PA system. When a phone user desires to make an announcement over the PA system, the user can speak into the PBX phone where the users voice is digitized and sent to the PBX hub. There the control unit sends the digitized voice to the codec where it is converted into paging or PA analog audio and sent to an audio output. Furthermore, if the PBX is part of a computer network, audio saved on, or created by, a workstation on the network can be sent to the codec in the PBX hub for transmission to the PA system. The codec in the PBX hub is therefore able to receive audio from a plurality of different sources and in a plurality of different formats from the network. All of these different sources can then be broadcast over the PA system. The present invention provides for a greater use of a connection between a PBX system and a PA system. The quality of audio broadcast from a PA system can also be maximized by selectively adjusting the sample size and sample rate according to network conditions in the present invention. Another advantage in using the A/D structure of a personal computer sound card is that the same structure is able to receive external audio for audio on hold, and to generate PA system audio for broadcasting over a PA system but two separate codecs are not needed. Also if the PBX is incorporated into a computer network, it is possible for any computer on the network to access the registers and selectively adjust the sample rate and sample size. A user friendly interface program can be provided to all users of the network so that the quality of the audio and the traffic on the network can be easily adjusted and optimized.

The present invention provides an improved PBX system which is simple in design, easily constructed, and very versatile in operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
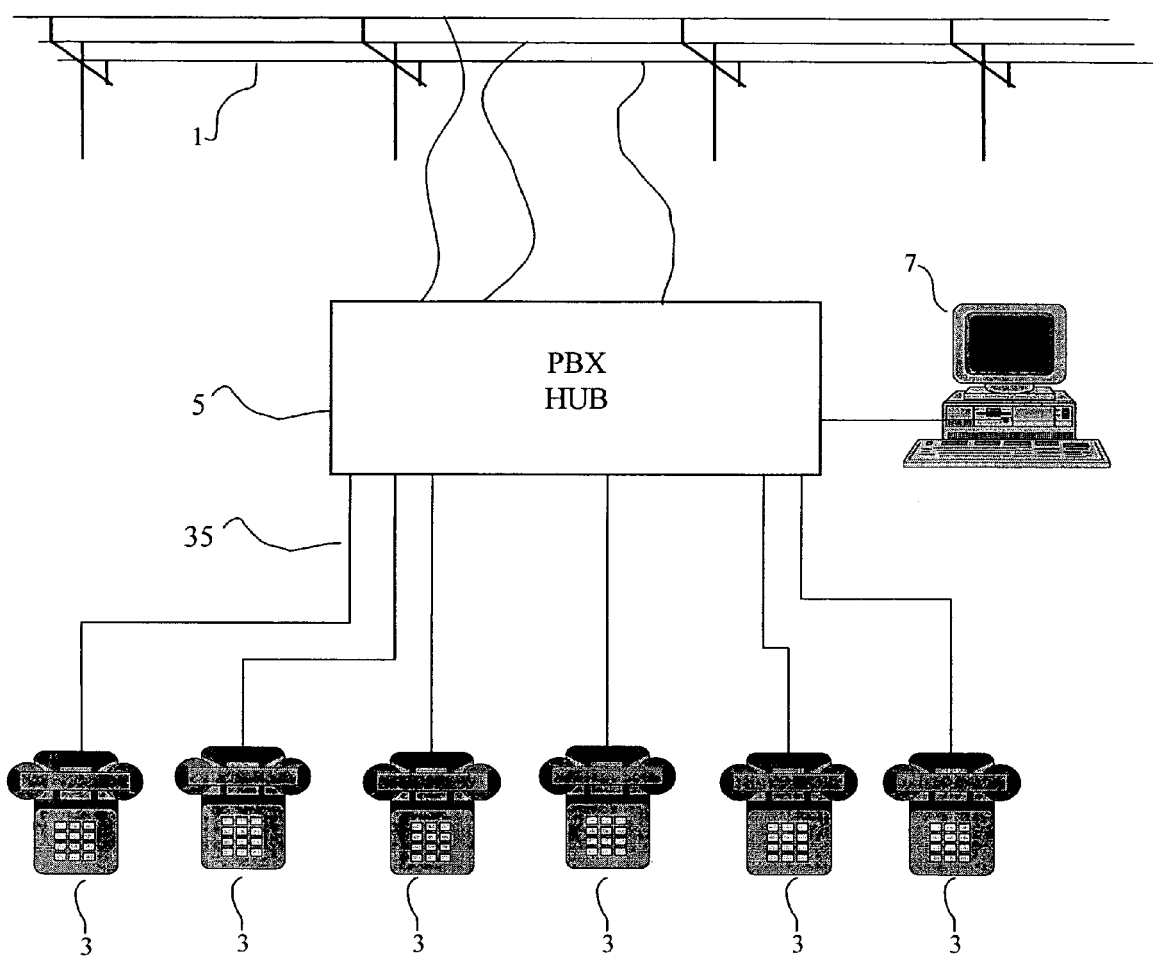
FIG. 1 is an overall schematic you of a PBX telephone system.

Referring to be drawings, and in particular to FIG. 1, the present invention is incorporated into a PBX telephone system which connects to an external telephone complex, such as a PSTN. A plurality of individual PBX phones 3 are connected to a PBX hub 5. The PBX hub 5 controls how the individual phones 3 communicate with the PSTN 1 and how the individual PBX phones 3 communicate between themselves. A system workstation 7 allows an operator to program the PBX hub 5 and monitor the status of the PBX hub 5. The PBX phones 3 are connected to the PBX hub 5 by wires or lines 35.

Figure 2:
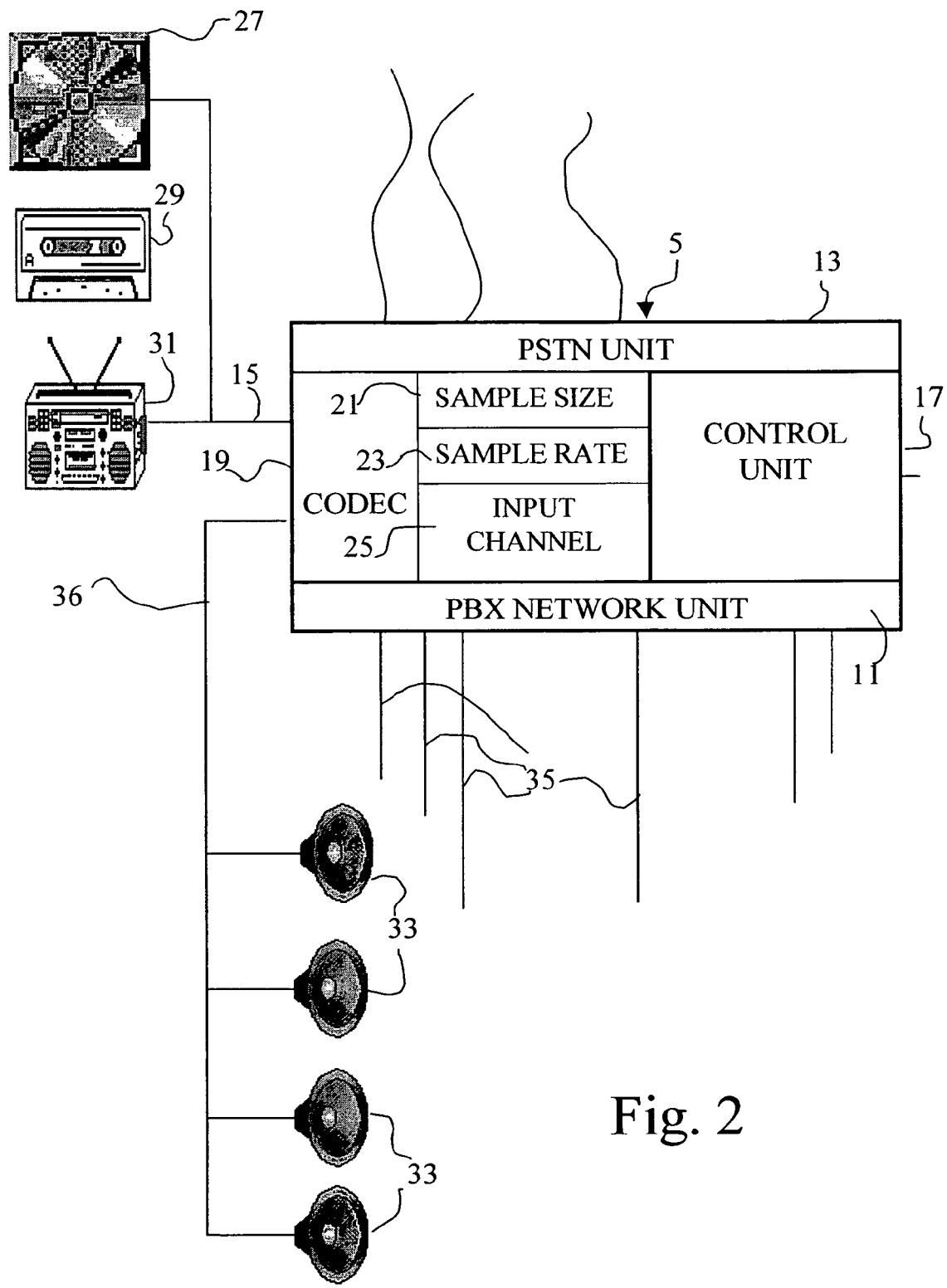
FIG. 2 is a schematic view of a PBX hub according to the present invention being connected to an audio input and an audio output.

Inside the PBX hub 5 as shown in FIG. 2 is a PSTN unit 13 which connects to the PSTN 1. The PBX hub 5 also includes a PBX network unit 11 for connection to the individual PBX phones 3 over the phone lines or wires 35. A control unit 17 controls the connections between the individual PBX phones 3 and between the PBX phones 3 and the PSTN 1.

Figure 3:
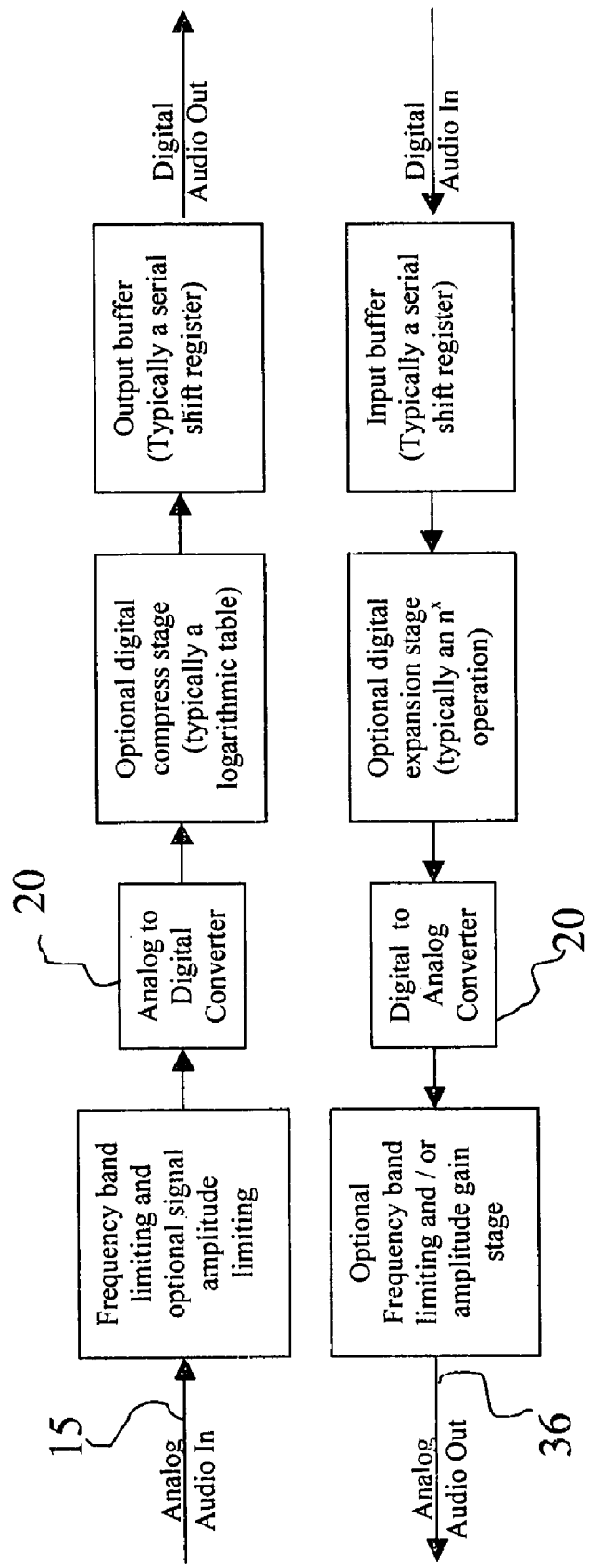
FIG. 3 is a block diagram showing a general operation of a codec.

Also included in the PBX hub 5 is a codec 19 which operates in a basic manner according to FIG. 3. The codec 19 includes A/D structure 20 where the sample size and sample rate are selectively adjustable according to values in the sample size register 21 and the sample rate registered 23. In the preferred embodiment, the present invention uses a codec manufactured by National Semiconductor and described as LM4549 AC '97 Rev 2.1 Codec with Sample Rate Conversion and National 3D Sound. The data sheets for this codec are included in the appendix of this application.

An input channel register 25 can also be included to indicate which one of a plurality of external audio sources are to be used. The control unit 17 can change the values in the registers 21, 23 and 25. Workstation 7 includes a user interface so that an operator can determine the presently set values in the registers 21, 23 and 25 and can also change the values in those registers. It is also possible for the control unit 17 or the workstation 7 to monitor traffic across the PBX network and automatically change the values in the sample size and sample rate registers 21 and 23 to maximize quality and minimize traffic disruptions.

The codec 19 has an external audio input 15 which can be connected to a plurality of external audio sources, such as a CD player 27, a tape player 29 and/or a radio 31. The codec 19 also has an external audio output 36 for generating analog audio output to a paging or PA system 33.

Figure 4:
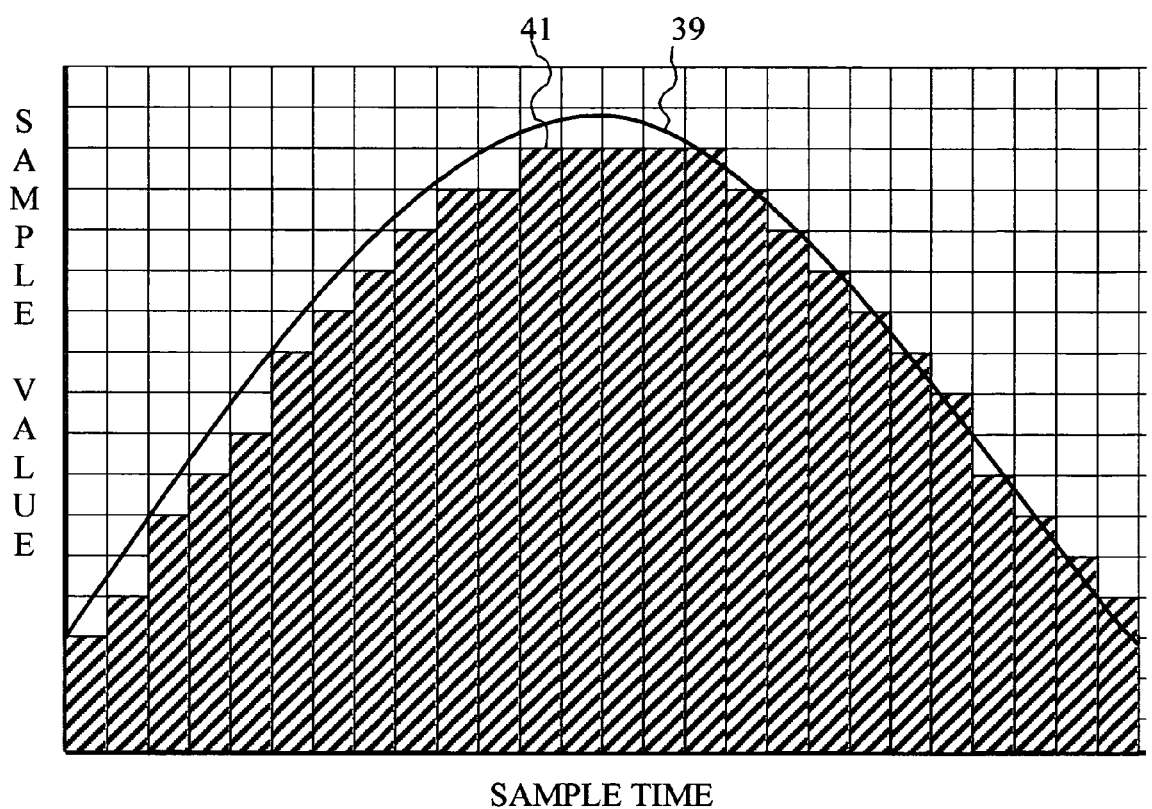
FIG. 4 is a graph comparing an analog signal to a digital signal at a first sample rate and sample size.

FIG. 4 is a graph of an analog signal 39, and a first digital signal 41 which was created from the analog signal 39 according to the sample time units and sample value units shown along the x and y axis respectively. At every sample time, indicated by the vertical lines in FIG. 4, the analog signal 39 is measured and rounded down to the nearest value or unit of the available different levels, represented by the horizontal lines. This first digital signal 41 holds this value until the next sample time. The first digital signal 41 thus resembles the analog signal 39, but does not exactly equal the analog signal.

Figure 5:
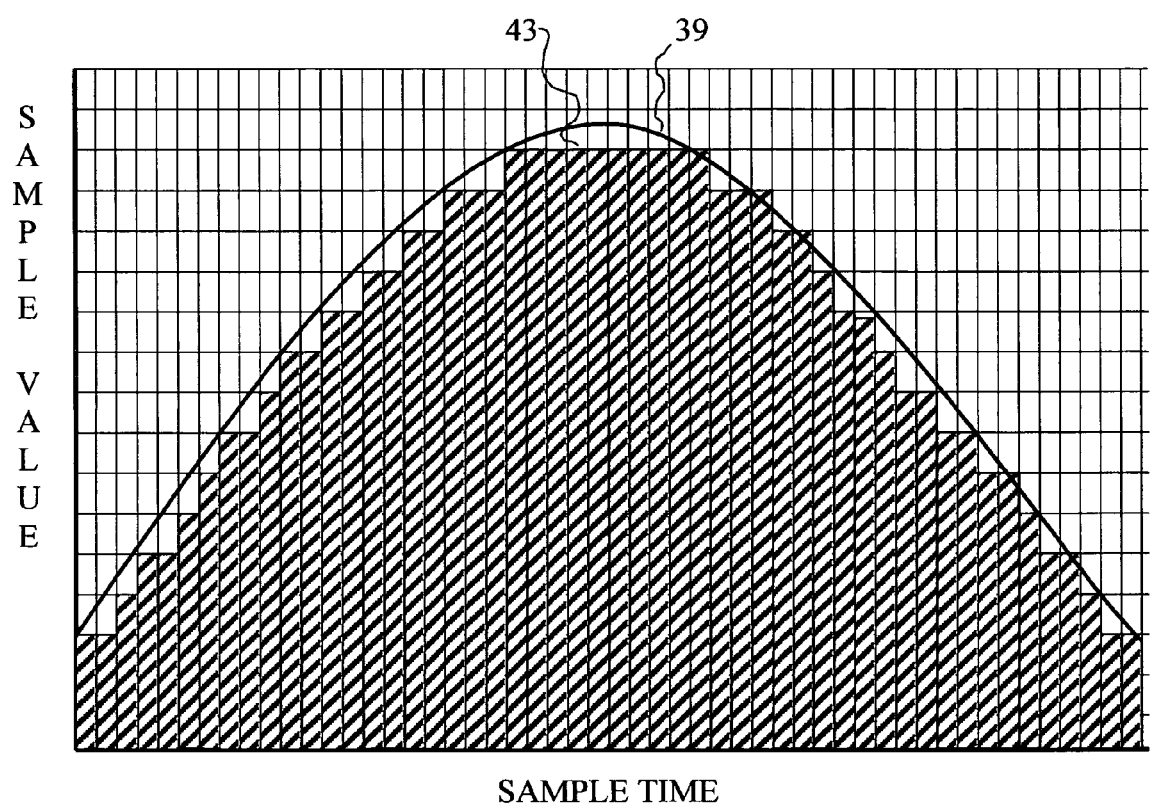
FIG. 5 is a graph comparing an analog signal to a digital signal at a second sample rate and the first sample size.

FIG. 5 is a graph of the analog signal 39 and a second digital signal 43. The sample time in FIG. 5 has been made smaller. This allows the second digital signal 43 to more precisely follow the analog signal 39. The second digital signal 43 more quickly picks up changes of the analog signal 39 and therefore the second digital signal 43 is a higher quality signal than the first digital signal 41. A disadvantage of having smaller sample times, which creates a higher sample rate, is that more digital values or measurements need to be transmitted to represent the same signal. This can increase traffic across a PBX network and reduce the quality of other telephone conversations on the network.

Figure 6:
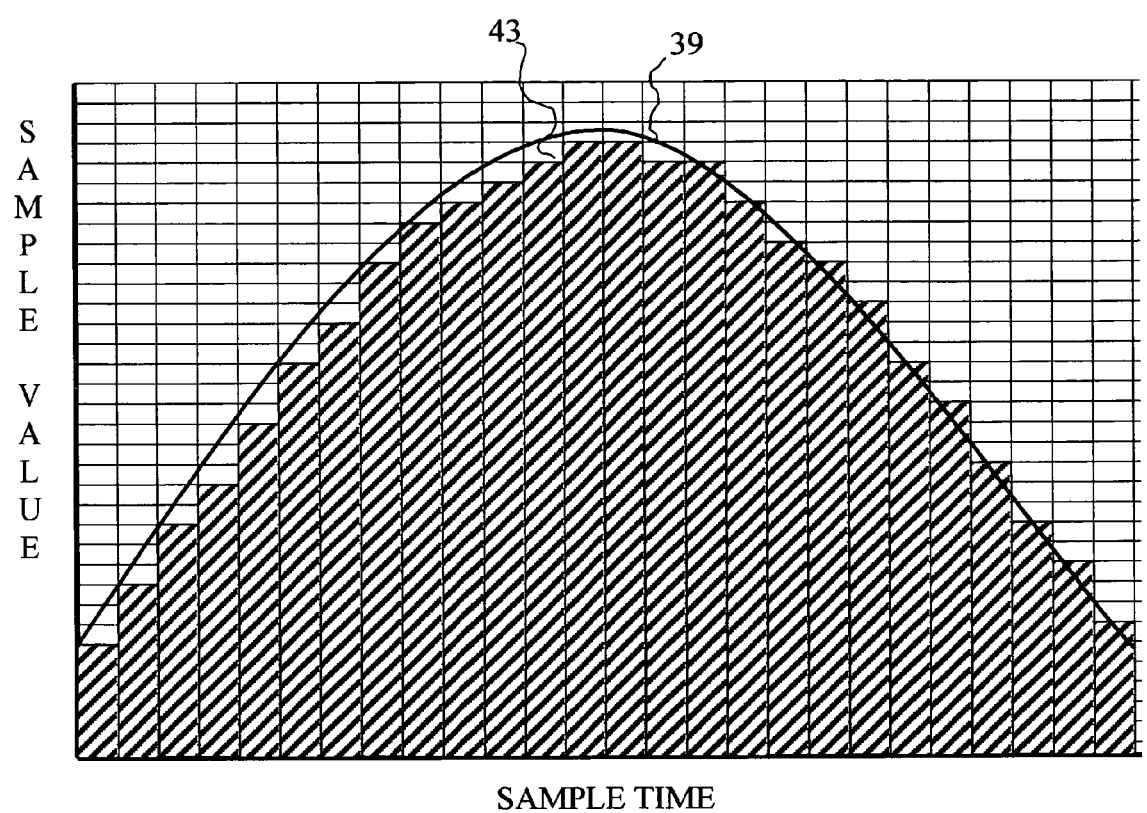
FIG. 6 is a graph comparing an analog signal to a digital signal at the first sample rate and a second sample size.

FIG. 6 is a graph of analog signal 39 and its equivalent third digital signal 45 according to the same sample times as in FIG. 4, but with smaller sample value increments or levels. The value increments or levels in FIG. 6 are more precise and therefore when a measurement or sample is made, there is less rounding because the increments or levels are closer together. This also increases the quality of the third digital signal 45 in comparison with the first digital signal 41. The disadvantage is that using smaller value increments or levels increases the total number of possible value increments or levels and therefore the number representing the analog signal at each sample time needs to be larger. Transmitting larger numbers each sample time also increases the data flowing across the network and increases traffic.

The operator of the present invention can adjust the parameters of the sample size and sample rate through a user interface on the workstation 7. If the sample rate is made slower, then there will not be as many samples per unit time and quality will go down. If the sample rate is made higher then quality goes up, but data traffic also goes up. If sample size goes up, more value increments or levels can be measured and quality goes up, but also does data traffic. Likewise if sample size goes down, data traffic goes down, but also does quality.

The operator is allowed to adjust the sample rate and size according to needs of each particular application. If the PBX is used in a telephone sales department, then quality of music on hold could be important, and the sample rate and sample size could be set high. Correspondingly, the rest of the PBX system should be designed to handle high data traffic. If an inexpensive PBX system is desired, the sample size and sample rate can be set low to allow the use of slower and less expensive components in the PBX system.

The control unit 17 can also be programmed to automatically adjust the sample size and sample rate depending on the other traffic over the network. If there are few telephone conversations being processed, quality can be increased to take advantage of unused capacity. If a higher than average number of telephone conversations are being processed, the quality of the music on hold can be lowered to help process the conversations.

The adjusting of the sample size and rate is also possible with the digital to analog conversion for the external PA or paging audio. The same results occur between the sample size, the sample rate, quality, and network traffic. With the A/D structure used in personal computers, it is possible to use the same structure for converting external analog audio to digital PBX audio for audio on hold, and to convert PBX digital audio to external PA system analog audio. This reduces the amount of structure needed which reduces the cost, while increasing the ability.

Figure 7:
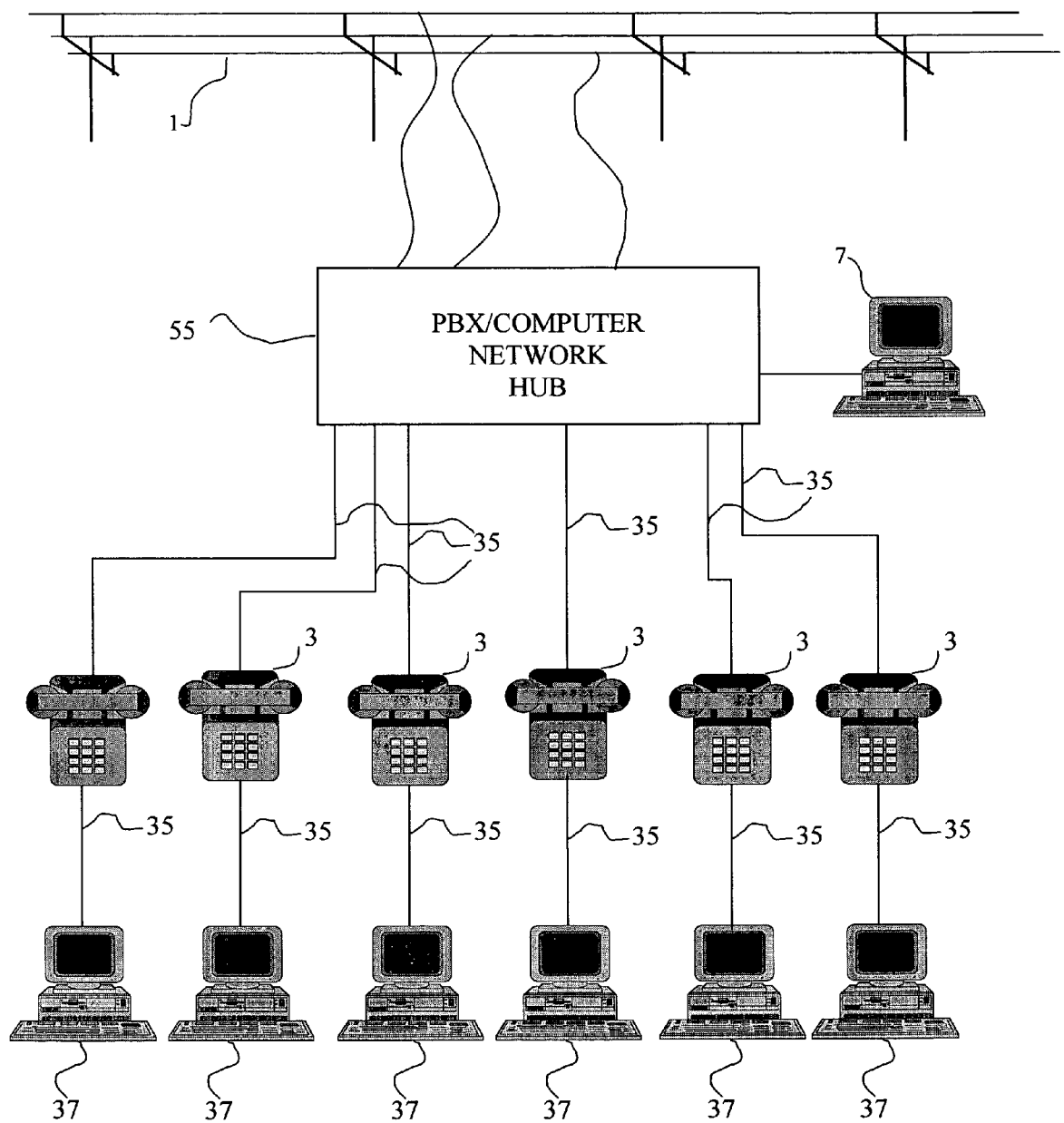
FIG. 7 is an overall schematic view of a PBX telephone system incorporated into a computer network.

If the PBX is incorporated into a computer network as described in patent application Ser. No. 09/203,542, the present invention is even more advantageous. Such an incorporation is shown in FIG. 7. Computer data from local workstations 37 flow through the PBX phones 3 to the PBX/computer network hub 55 and then out of hub 55 through other PBX phones 3 to the desired other local workstations 37. Controlling data traffic across a PBX/computer network is even more important because of the additional traffic from the computers. It is also advantageous to adjust the sample size and rate to take advantage of any excess capacity during low times of computer use, since computer networks generally use high speed components.

The sound cards of the local workstations can also be used as the codec of the PBX system. One of the workstations 37 can receive external audio through its sound card and convert this external audio into a digital on hold signal that is used by those phone conversations that have been put on hold. Likewise if a particular work station has a digital audio file, it can send this file to external audio output of the hub 55 for transmission to the PA system.

While specific embodiments of the invention have been shown and described in detail to illustrate the application of the principles of the invention, it will be understood that the invention may be embodied otherwise without departing from such principles.

What is claimed is:

1. A telephone system comprising:
   an analog audio input;
   a coder/decoder for receiving analog audio from said audio input and converting said analog audio into digital audio;
   a control unit connected to said coder/decoder for selectively adjusting one of sample size and sample rate parameters of said coder/decoder;
   a public switched telephone network (PSTN) unit connected to said control unit and for connecting to a public switched telephone network;
   a private telephone network unit connected to said control unit for connecting to individual telephone clients, said control unit controlling telephone calls from said PSTN unit and said private telephone network unit, said coder/decoder includes a register selectively adjusting one of said sample rate and said sample size based on traffic through said private telephone network unit, said control unit being selectively changeable of a value in said register of said coder/decoder;
   a user interface connected to said control unit, said user interface displaying one of said sample size and said sample rate, said user interface being receivable of one of a new sample size and a new sample rate from an operator for forwarding to said control unit, said control unit configuring said coder/decoder for said one of said new sample size and said new sample rate.

2. A telephone system in accordance with claim 1, wherein:
   said control unit selectively adjusts said sample size of said digital audio.

3. A telephone system in accordance with claim 1, wherein:
   said private telephone network unit is connected to said coder/decoder unit for transmitting said digital audio to telephone clients.

4. A telephone system in accordance with claim 1, wherein:
   said coder/decoder formats said digital audio as computer network packets with an external audio address.

5. A telephone system in accordance with claim 1, wherein:
   said coder/decoder has an audio bandwidth between 44 kHz and 20 Hz.

6. A telephone system in accordance with claim 1, further comprising:
   a paging audio output connected to said coder/decoder, said coder/decoder receiving said digital audio from said private telephone network unit and converting said digital audio to paging analog audio, said coder/decoder transmitting said paging analog audio to said paging audio output.

7. A telephone system in accordance with claim 6, wherein:
   said coder/decoder is receivable of said digital audio at one of a plurality of sample sizes and sample rates.

8. A telephone system in accordance with claim 1, wherein:
   said coder/decoder has a larger audio bandwidth than said PSTN unit.

9. A telephone system comprising:
   a private telephone network unit for receiving digital audio from telephone clients;
   a coder/decoder for receiving digital audio from said private telephone network unit and converting said digital audio into paging analog audio, said coder/decoder being receivable of said digital audio at one of a plurality of sampling sizes and sampling rates;
   a paging audio output connected to said coder/decoder and receiving said paging analog audio for transmission to a paging system;
   an analog audio input, said coder/decoder receiving analog audio from said audio input and converting said analog audio into digital audio;
   a control unit connected to said coder/decoder for selectively adjusting one of a sample size and a sample rate of said digital audio from said coder/decoder, said coder/decoder selectively adjusting one of said sample rate and said sample size of said digital audio formed from said analog audio based on traffic through said telephone network unit;
   a user interface connected to said control unit, said user interface displaying one of said sample size and said sample rate of said digital audio formed from said analog audio, said user interface being receivable of one of a new sample size and a new sample rate from an operator for forwarding to said control unit, said control unit configuring said coder/decoder for said one of said new sample size and said new sample rate.

10. A telephone system in accordance with claim 9, wherein:
    said coder/decoder has an audio bandwidth between 44 kHz and 20 Hz.

11. A telephone system in accordance with claim 9, further comprising:
    a public switched telephone network (PSTN) unit for connecting to a public switched telephone network and connected to said private telephone network unit, said coder/decoder having a larger audio bandwidth than said PSTN unit.

12. A telephone system comprising:
    a plurality of private telephones, each of said telephones including a coder/decoder for receiving analog audio from a user and converting said analog audio into digital audio, said coder/decoder of each of said telephones being receiveable of digital audio at a plurality of sampling sizes and sampling rates, and converting said digital audio to analog audio;
    a private telephone network unit connected to said plurality of telephones and controlling telephone conversations between said plurality of telephones, said private telephone network unit receiving said digital audio form said telephones, said private telephone network unit redirecting said digital audio from one said telephone to another said telephone;
    an external audio coder/decoder connected to said telephone network unit and receiving external analog audio, said external audio coder/decoder selectively converting said external analog audio into external digital audio at one of a plurality of sampling sizes and sampling rates, said coder/decoder sending said digital audio to said plurality of telephones through said telephone network unit;
    a control unit connected to said external audio coder/decoder and monitoring traffic between said telephones, said control unit automatically changing said sample size and sample rate of said external audio coder/decoder to substantially maximize quality and minimize traffic disruptions a user interface connected to said control unit, said user interface displaying one of said sample size and said sample rate, said user interface being receivable of one of a new sample size and a new sample rate from an operator for forwarding to said control unit, said control unit configuring said coder/decoder for said one of said new sample size and said new sample rate.

13. A system in accordance with claim 12, further comprising:
a computer network with a plurality of workstations, said plurality of telephones and said telephone network unit communicating with each other through said computer network.

14. A system in accordance with claim 12, wherein: said control unit lowers one of said sample size and sample rate of said external audio coder/decoder when traffic increases.

15. A system in accordance with claim 12, wherein: said control unit sets one of said sample size and sample rate of said external audio coder/decoder according to a policy of an operator of the system.

16. A system in accordance with claim 12, wherein:
said external audio coder/decoder selectively converts said external analog audio into said external digital audio at one of a different sample size and rate than said coder/decoder of said plurality of telephones converts the analog audio from the user.

17. A system in accordance with claim 12, further comprising:
a paging audio output connected to said external audio coder/decoder, said telephones sending paging digital audio to said paging output, said codec of said telephones selectively converting analog audio from the user at a different one of said sample size and rate than audio for other said telephones.

* * * * *